United States Patent Office 3,091,612
Patented May 28, 1963

3,091,612
ALKYLATED METHYLOL BENZOGUANAMINE
James R. Stephens, Gary, Ind., assignor to Standard Oil Company, Chicago, Ill., a corporation of Indiana
No Drawing. Filed Aug. 7, 1961, Ser. No. 129,545
6 Claims. (Cl. 260—249.9)

This invention relates to novel alkylated methylol benzoguanamines; also it relates to organic solvent soluble baked finish surface coating compositions and storage stable water soluble baked finish surface coating compositions utilizing the novel alkylated methylol benzoguanamines.

A novel group of alkylated methylol benzoguanamines has been discovered; these are the tetrakis(alkoxymethyl)benzoguanamines wherein each "alkoxy" has 1–3 carbon atoms. Unexpected properties are possessed by benzo-guanamines of this class when at least two different carbon number alkoxys are present in the molecule; to illustrate, one ethoxy and three methoxys forming mono(ethoxymethyl)tri(methoxymethyl)benzoguanamine. An equilibriated mixture of compounds falling within the defined class, wherein at least two different carbon number alkoxys are present on a number of the molecules such that the mixture is non-crystalline at ordinary temperatures, is of particular utility in water soluble surface coating compositions.

It has been discovered that superior baked finish surface coatings are obtained from fluid compositions consisting essentially of a polyester, the defined benzoguanamine and an organic solvent for the polyester and the benzoguanamine. These polyesters are obtained from certain benzene tricarboxylic acids, alkylene glycols and alkanedioic acids.

It has also been discovered that exceptional storage stability is possessed by water soluble compositions consisting essentially of a water soluble form of the above-mentioned polyester, the above-mentioned benzoguanamines wherein at least two different carbon number alkoxys are present in the molecule—or an equilibriated mixture thereof—and water.

THE ALKYLATED METHYLOL BENZO-GUANAMINES

The novel alkylated methylol benzoguanamines of the invention are the tetrakis(alkoxymethyl)benzoguanamines wherein each alkoxy constituent has 1–3 carbon atoms. These compounds may also be named N,N,N',N'-tetrakis-(alkoxymethyl) - 2,6 - diamino - 4 - phenyl - s - triazine where each alkoxy constituent has 1–3 carbon atoms. In other words, the alkoxy constituent (R—O—) contains an alkyl group which may be methyl, ethyl, n-propyl or isopropyl. Illustrations of these benzoguanamines wherein all the alkoxys have the same number of carbon atoms are: N,N,N',N'-tetrakis(methoxymethyl)-2,6-diamino - 4 - phenyl-s-triazine, N,N,N',N' - tetrakis(ethoxymehyl)2,6-diamino-4-phenyl-s-triazine, and N,N,N',N'-tetrakis(isopropyloxymethyl) - 2,6 - diamino - 4 - phenyl-s-triazine.

Those compounds are included in the scope of the invention wherein at least one alkoxy constituent has a different number of carbon atoms than the other alkoxy constituents. These may be defined as tetrakis(alkoxymethyl)benzoguanamines wherein each alkoxy has from 1–3 carbon atoms and at least one alkoxy has a different number of carbon atoms than the others. Illustrations of these chemically-mixed benzoguanamines are: di(ethoxymethyl)di(methoxymethyl)benzoguanamine, mono(ethoxymethyl)tri(methoxymethyl)benzoguanamine, di(isopropyloxymethyl)di(methoxymethyl)benzoguanamine and tri(ethoxymethyl)mono(isopropyloxymethyl)benzoguanamine.

It has been observed that the defined benzoguanamine wherein all of the alkoxy constituents have the same number of carbon atoms are crystalline solids at ordinary temperatures. Herein ordinary temperatures are intended to include the range of about 50° F.–100° F. Unexpectedly, the defined benzoguanamines wherein at least one alkoxy has a different number of carbon atoms than the other alkoxys are characterized by the non-crystalline state at ordinary temperatures. The term "non-crystalline" is intended to include liquids which are fairly mobile, viscous liquids and glass-like materials.

It has been observed that a physical mixture of two tetrakis(alkoxymethyl)benzoguanamines differing only in the number of carbon atoms in the alkoxy constituents, for example, tetrakis(methoxymethyl)benzoguanamine and tetrakis(ethoxymethyl)benzoguanamine, do not blend to a material which is non-crystalline at ordinary temperatures. However, it is possible to obtain a mixture which includes benzoguanamines containing only one type of alkoxy, which mixture is characterized by the non-crystalline state at ordinary temperatures. This mixture is the equilibriated mixture obtained when tetramethylol benzoguanamine is simultaneously alkylated with materials affording at least two different carbon number reactants. To illustrate: the equilibriated mixture produced when tetramethylol benzoguanamine is alkylated with a mixture of ethanol and methanol or a mixture of methanol and isopropanol includes benzoguanamines having chemically mixed alkoxy constituents and also molecules having only one type of alkoxy constituent. For convenience, the proportion of alkoxy constituents of one carbon number and alkoxy constituent of another carbon number present in an equilibriated mixture are based on the alkylating compounds charged to the alkylation reaction. Only a small amount of the different alkoxy affording compound is needed to obtain the equilibriated product characterized by the non-crystalline state. The exact amount of different alkoxy affording compound is dependent upon the types of alkoxy constituents desired to be present in the final tetrakis(alkoxymethyl)benzoguanamine mixture. In general, 10%, on a molar basis, of the alkoxy constituents present in the mixture differing in carbon number from the other alkoxy constituents will produce an equilibriated mixture of the desired non-crystalline state. Specific illustrations of equilibriated mixtures are: the equilibriated mixture obtained when the alkoxy constituents are derived from ethanol and methanol; in one instance, the molar ratio of the "1" carbon alkoxys to "2" carbon alkoxys is about 1—the ethanol/methanol molar ratio charged to the alkylation reaction being about 1; in another instance, the molar ratio of "1" carbon alkoxys to "2" carbon alkoxys is about 3—the molar ratio of methanol/ethanol charged to the alkylation reaction is about 3.

The defined benzoguanamines are of low solubility in water; even the equilibriated mixtures are low in water solubility. All of the defined benzoguanamines possess substantial solubility in organic solvents commonly used in the surface coating industry.

Hereinafter there is set forth a preparation of tetramethylol benzoguanamine and 4 illustrative benzoguanamines coming within the scope of the invention.

EXAMPLES

*Tetramethylol benzoguanamine.*—Five hundred forty grams of 37% formalin was brought to pH–8 with NaOH and heated to 75° C. Two hundred grams of benzoguanamine was stirred into the solution. Reaction occurred rapidly giving complete solution in 5 minutes. The solution was then cooled to precipitate tetramethylol benzoguanamine. It was filtered off and dried overnight in a circulating air oven at 40° C. It melted at ca. 132 to 142° C.

Example 1

*Tetrakis(methoxymethyl)benzoguanamine.*—Two hundred grams of tetramethylol benzoguanamine was slurried in 600 ml. of methanol at room temperatures. Then with rapid stirring 28.2 ml. of concentrated hydrochloric acid was added. The nature of the solid material in suspension changed from an amorphous white solid to colorless crystalline material. Stirring was continued 15 minutes and then sodium bicarbonate was added until $CO_2$ was no longer evolved. The solid product was filtered off and recrystallized from hot water to produce needle-like crystals of M.P. 92° C. This analyzed for 56.14% C, 7.31% H, and 19.29% N. Theoretical for tetrakis-(methoxymethyl)benzoguanamine: 56.2% C, 6.94% H, and 19.3% N.

Example 2

*Tetrakis(ethoxymethyl)benzoguanamine.* — Two hundred grams of tetramethylol benzoguanamine was slurried with 600 ml. of absolute ethanol at room temperature. Then with rapid stirring 28.2 ml. of concentrated hydrochloric acid was added. After 15 minutes of stirring complete solution had taken place. Sodium hydroxide was then added until the pH was 8. The mixture was filtered from NaCl then concentrated in vacuum to 5 mm. pressure and 90° C. The crude benzoguanamine ether weighed 194 g. On cooling it slowly solidified to low-melting waxy crystals. It was difficult to recrystallize. Some of it was dissolved in a mixture of formamide and ethanol and left to evaporate. This technique slowly gave crystals of pure tetrakis(ethoxymethyl)benzoguanamine of M.P. 60° C. sharp. Analysis for nitrogen showed 17.1%; theoretical is 16.7%.

Example 3

A mixture of 200 g. tetramethylol benzoguanamine, 50.1 g. of methanol, and 72.0 g. of ethanol was stirred to a paste, then 28 ml. of concentrated hydrochloric acid was added. A mildly exothermic reaction took place yielding near solution in 2 minutes. Five minutes later a solution containing 50.1 g. of methanol and 72.0 g. of ethanol was added. The overall molar ratio of the two alcohols was 1. Stirring was continued an additional 7 minutes to give complete solution. Sufficient 20% NaOH was then added to bring the pH to 8. The two phase liquid was then evaporated on a steam bath under reduced pressure until only a liquid organic phase and a solid (sodium chloride) phase was present. The solid was removed by filtration under pressure to yield an equilibrated mixture of methyl ethyl ethers of tetramethylol benzoguanamine. The material remained liquid after several weeks' storage. One-half gram of this product could not be dissolved in 100 g. of water.

Example 4

Two hundred grams (0.65 mole) of tetramethylol benzoguanamine was agitated with 150 g. (4.7 moles) of methanol and 72 g. (1.57 moles) of ethanol at 25° C. The overall molar ratio of methanol/ethanol was 3. Twenty-two milliliters of concentrated (96%) sulfuric acid was then added over a half-minute period. The mixture exothermed to ca. 50° C. and complete solution was obtained in 2 minutes. Ten minutes after acid addition the solution was neutralized to pH=8 by the careful addition of about 120 ml. of 20% NaOH. This addition required 5 minutes. The mixture was filtered from precipitated inorganic salts. The clear filtrate was then concentrated in vacuum at 85° C. to a thick syrup containing additional precipitated inorganic salts. It was finally filtered under pressure to yield an extremely viscous clear colorless liquid. No further purification was necessary.

ILLUSTRATIVE SURFACE COATING COMPOSITIONS

A phthalic anhydride type polyester resin was prepared by introducing 3 moles of phthalic anhydride, 3 moles of trimethylol propane, 1 mole of neopentyl glycol and 1 mole of adipic acid into a glass vessel. This vessel was provided with a propeller stirrer, a thermometer, a sparge tube of introducing nitrogen, and a condenser for removing water produced in the polycondensation reaction. The temperature in the vessel was gradually increased until 400° F. was reached. The materials in the vessel were held at this temperature until the product had an acid number (mg. KOH/g.) of 50.

The polyester was dissolved in a 60–40 xylene-butanol solvent. Titanium dioxide was added to the solution in a ratio of 0.9 part by weight of titanium dioxide to 0.8 part by weight of polyester. In one instance, tetrakis-(methoxymethyl)benzoguanamine was blended into the pigmented polyester solution to a level of 30 parts by weight of the benzoguanamine for 70 parts by weight of the polyester resin. In another instance, tetrakis(ethoxymethyl)benzoguanamine was blended into the pigmented polyester solution to a level of 20 parts by weight of the benzoguanamine for 80 parts by weight of the polyester resin. Panels were prepared by applying the pigmented blends to bonderized steel plates. The coated panels were baked in an oven for 30 minutes at 300° F. The baked finish on each panel was measured and found to be 1.3–1.5 mils in thickness.

The cured panels were tested in accordance with standard testing procedure; these tests were impact in inch pounds; flexibility when bent about a 1/8 inch mandrel; resistance to staining by iodine; resistance to softening by acetone; resistance to 2 percent (NaOH) solution for 16 hours; and resistance to marring.

The phthalic anhydride polyester-tetrakis(methoxymethyl)benzoguanamine 70:30 blend panels at an impact resistance of 2 inch pounds; cracks were evident in the flexibility test; the films passed the iodine, the acetone and the 2 percent (NaOH) test; the film failed the mar resistance test.

The phthalic polyester-tetrakis(ethoxymethyl)benzoguanamine 80:20 blend panels at an impact test of 2 inch pounds; cracks were present at the bend in the flexibility test; the films passed the acetone, the 2 percent (NaOH) and the mar resistance tests; the films failed the iodine stain test.

It is considered that the phthalic polyester-defined benzoguanamine surface coating compositions are acceptable by present commercial standards for baked finishes which do not require high impact strength and exceptional flexibility.

ORGANIC SOLVENT SOLUBLE BAKED FINISH SURFACE COATING COMPOSITIONS

The Polyester Resin

The acidic member reactant in the preparation of the polyester resin (polycondensation reaction product) is an unsubstituted benzene tricarboxylic acid or of the corresponding anhydride; these are trimellitic acid, trimellitic anhydride, hemimellitic acid, hemimellitic anhydride, and trimesic acid.

The polyester resin portion of the composition consists essentially of the polycondensation reaction product of one of the above defined acidic members with an alkylene glycol having 2–10 carbon atoms and an alkanedioic acid having 4–10 carbon atoms. The acidic member, the glycol, and the alkanedioic acid may be charged to the polycondensation reaction in a number of molar ratios. The molar ratio of "acidic member/glycol/alkanedioic acid" charged falls in the range of 2.3/7/3 to 3.2/7/0.5; the carboxyl group (COOH) affording reactants charged and the hydroxyl group (OH) affording reactants charged are controlled to provide a molar ratio of "hydroxyl groups/carboxyl groups" within the range of 1.05 to 1.40.

In other words, there is present in the reaction zone an excess of hydroxyl groups of roughly about 5–40%. The poly-condensation reaction is continued until a product is obtained which is characterized by an acid number of about 25–80. Acid number herein means the milligrams of KOH used per gram of polyester.

The alkylene glycols may be either simple glycols or ether glycols which have from 2 to 10 carbon atoms. Illustrations of these alkylene glycols are ethylene glycol, propylene glycol, 1,4-butanediol, neopentyl glycol, 1,3-hexanediol, diethylene glycol, dipropylene glycol, triethylene glycol, tetraethylene glycol and decanediol. Usually, the glycols having 4–10 carbon atoms are used. Especially good results are obtained with the butanediols and pentanediols.

The polyester requires the presence of alkanedioic acid having 4–10 carbon atoms. It is preferred to use the acids containing 6–7 carbon atoms. Illustrative alkanedioic acids are succinic, glutaric, adipic, pimelic, suberic, azelaic, and sebacic. It is to be understood that the anhydrides of these acids may also be utilized.

For some purposes, it is desirable to modify the straight acidic member-glycol-alkanedioic acid polyester resin by introducing into the reaction a modifier which may be either an alkane monocarboxylic acid having 6–13 carbon atoms or an alkane monohydric alcohol having 6–13 carbon atoms. The alkane monocarboxylic acids are saturated aliphatic acids containing only carbon, hydrogen, and oxygen atoms. Illustrative of these alkane monocarboxylic acids are caproic, enanthic, caprylic, pelargonic, capric, n-undecyclic, lauric and tridecanoic.

The alkane monohydric alcohols are saturated monohydric aliphatic alcohols having only carbon, hydrogen and oxygen atoms. Illustrative of these alkane monohydric alcohols are butyl, amyl, caproyl, capryl, undecyl, and lauryl. Particularly suitable of these alcohol modifiers are mixtures obtained by the Oxo process; commercially available Oxo alcohols are isooctyl alcohol, nonyl alcohol, decyl alcohol, and tridecyl alcohol.

The reactants in the preparation of the polyester are charged in molar amounts such that an excess of hydroxyl groups is present in the polycondensation reaction zone. The molar ratio "hydroxyl groups/carboxyl groups" provided by the hydroxyl group affording reactants and the carboxyl group affording reactants is controlled within the range of 1.05/1 to 1.40/1. The amount of excess hydroxyl groups will be determined in each instance by the requirements of the particular polyester.

For convenience in setting forth the proportional molar amounts of the three essential reactants, the glycol reactant has been held at seven (7). The desired resin is obtainable while varying the proportional molar amount of the defined acidic member over the range of about 2.3 to 3.2. The alkanedioic acid molar proportion is varied over the range of 0.5 to 3. In order to obtain the desired polyester resin, the proportional molar amounts within the reaction system of "acidic member/glycol/alkanedioic acid" is held in the range of 2.3/7/3 to 3.2/7/0.5. When one or more modifiers are present, commonly the alkanedioic acid amount and acidic member amount are adjusted, within the above ranges, to provide proportional amounts of reactants giving an excess of hydroxyl groups falling within the hereinabove defined range.

The acidic member, the defined glycol, and the alkanedioic acid are condensed under the well-known polycondensation reaction conditions. In general, the polycondensation reaction is carried out at a temperature between about 200° F. and about 450° F., and more usually about 300° F. The reaction is carried out under an inert atmosphere, with continuous removal of water of reaction and for a time producing the desired acid number. When operating with the anhydrides at the lower acid number products, it is desirable to observe the reacting mixture closely when approaching the completion of the reaction; the reaction mixture has a tendency to reach the gel point in a more or less abrupt fashion. However, observation of the reaction zone permits ready completion of the reaction without gelation.

The polycondensation reaction is continued until the product has an acid number between about 25–80; more usually this acid number is about 30–50. Polyester resins having this acid number produce superior baked finishes, and are readily converted to the water soluble forms.

The Defined Benzoguanamines

In the organic solvent soluble composition, a tetrakis-(alkoxymethyl)benzoguanamine, or mixtures thereof, is present in a hereinafter defined proportion; these benzoguanamines may be any one of those hereinabove defined.

The Organic Solvent

The polyester resin and the defined benzoguanamine are physically blended in hereinafter set out proportions. The two film-formers are dissolved in an organic solvent. Sufficient organic solvent is present to form a fluid composition. It is to be understood that the degree of fluidity is determined by the particular application of the composition, i.e., brush, gun or roller, and also by the temperature at which the composition is applied to the surface. In the case where pigments, etc., are present, fluidity will also be determined by the particular mode of application.

Any of the organic solvents commonly used in the surface coating industry for alkyd resins and polyester resins may be utilized for obtaining the desired fluidity. In some instances, it may be desirable to use solvents which are not evaporated from the film during the curing operation. However, ordinarily the solvents will be materials which volatilize before or during the curing operation. Illustrations of commonly used organic solvents are set out hereinafter. Ketones: acetone, methyl ethyl ketone, diethyl ketone, cyclohexanone, diacetone alcohol, acetophenone, diisobutyl ketone. Ethers and polyethers: 1,4-dioxane, 1,2-diethoxyethane (diethyl cellosolve), diisopropyl ether, diethylene glycol diethyl ether (diethyl carbitol). Esters: ethyl acetate, isopropyl acetate, isobutyl acetate, 2-methoxyethyl acetate (methyl cellosolve acetate), 2-ethoxyethyl acetate (cellosolve acetate), 2-(2-ethoxyethoxy)ethyl acetate (carbitol acetate). Ether-alcohols: 2-ethoxyethanol (cellosolve), 2-(2-ethoxyethoxy)ethanol (carbitol), dipropylene glycol monoethyl ether. Alcohols: methanol, ethanol, 1-butanol, isobutyl alcohol, cyclohexanol, n-octyl alcohol, 2-ethylhexyl alcohol.

In some instances, aromatic hydrocarbon solvents may be used alone; more commonly, these are admixed with one or more of the above listed solvents and particularly with the alcohols. Illustrative aromatic hydrocarbons are: benzene, toluene, xylene, ethylbenzene, tetralin.

Paraffinic hydrocarbon solvents may also be used in some instances. Illustrative of these solvents are: Paint and Varnish Makers' Naphtha and Standard Mineral Spirits.

Proportions

The hereinabove defined polyester and the hereinabove defined benzoguanamine are present in the final composition in proportions by weight to make 100 parts of "polyester:benzoguanamine" blend. The blend ranges in proportion from 95 parts of polyester:5 parts of benzoguanamine to 30 parts of polyester:70 parts of benzoguanamine. Superior baked finishes are obtained when the proportion of "polyester:benzoguanamine" in the blend ranges from about 80 parts of polyester:20 parts of benzoguanamine to 70 parts of polyester:30 parts of benzoguanamine.

The Composition

Both the defined polyester and the defined benzoguanamine are soluble in the hereinabove defined organic solvents. The polyester and the defined benzoguanamine may be added to the particular solvent at ordinary temperatures in the desired proportions to obtain the fluid composition. It may be convenient to prepare a solution of the polyester in the desired organic solvent and then add the particular defined benzoguanamine to that solution to obtain the final fluid composition.

The fluid compositions are storage stable and do not change characteristics during storage.

The fluid composition consisting only of the polyester, the defined benzoguanamine and organic solvent therefor may be used for clear baked finishes which may range from water-white clarity to opaque brown coloring. Enamel finishes may be obtained by adding pigments, extenders and dyes, if desired, to the clear composition. These baked enamel finishes are distinguished by a brilliant gloss and toughness.

The wet films positioned on the surface to be coated are cured by baking at elevated temperatures for the necessary time. In general, 30 minutes' time at 300° F. will give complete cures of substantially all the compositions. It is to be understood that temperatures higher than 300° F. may be used when shorter curing times are desired. The particular curing time will be dependent somewhat on the type and amount of the defined benzoguanamine present in the compositions.

EXAMPLES

Tests were carried out on baked films obtained from several compositions illustrative of the invention. Also, tests were carried out on panels prepared from phthalic polyesters admixed with two of the defined benzoguanamines. Also, panels were tested which had been prepared from a mixture of the defined polyester resin and tetramethylol benzoguanamine.

The polyester resin portion of the compositions of the invention was prepared using molar proportions of trimellitic anhydride, 2.6; neopentyl glycol, 7; and adipic acid, 1.75. In round numbers, this molar proportion is 3/8/2. Using the equipment and procedure set forth in the preparation of the phthalic polyester at Col. 4, a trimellitic polyester resin was prepared having an acid number of 50.

The above trimellitic polyester was dissolved in a 60–40 xylene-butanol solvent. Rutile titanium dioxide was added to the solution in a weight ratio of 0.9 part of dioxide to 0.8 part of polyester. This pigmented solution was used as a base to prepare a number of "benzoguanamine" containing enamels. Three of these enamels were prepared using tetramethylol benzoguanamine (Nos. 1–3, Table I). Two enamels contained tetrakis(methoxymethyl)benzoguanamine (Nos. 4–5, Table I). Three enamels contained tetrakis(ethoxymethyl)benzoguanamine (Nos. 6–8, Table I).

Using the pigmented solution of phthalic polyester previously described at Col. 4, six enamels were prepared. Three enamels contained tetrakis(methoxymethyl)benzoguanamine (Nos. 9–11, Table I), and three enamels contained tetrakis(ethoxymethyl)benzoguanamine (Nos. 12–14, Table I).

Cured, coated panels were prepared by applying the various enamels to bonderized steel plates; the curing was carried out in a heated oven at 300° F. for 30 minutes.

The baked film on each panel was measured and was tested in accordance with the various standard testing procedures, i.e., impact, flexibility when bent about an 1/8" mandrel, resistance to staining by iodine, resistance to softening by acetone, resistance to 2% (NaOH) solution for 16 hours, and resistance to marring.

The enamels used in the tests and the properties of the baked film are set out in Table I. The results show that tetramethylol benzoguanamine in the defined polyester (Nos. 1–3) is definitely poor with respect to the other enamels; except that the impact strength is better than that of the phthalic polyester containing enamels (Nos. 9–14). The enamels of Nos. 4–8—illustrative of the compositions of the invention—are vastly superior to the phthalic polyester enamels (Nos. 9–14), and the enamels of Nos. 1–3. These enamels of the invention are also superior in flexibility and, in general, better in the resistance properties than the phthalic polyester enamels and the tetramethylol benzoguanamine enamels. Considering the chemical difference between the phthalic anhydride and the trimellitic anhydride polyesters, the vast superiority of the enamels containing the trimellitic anhydride polyester is most unexpected.

TABLE I.—BAKED FILM PROPERTIES FROM SOLVENT COMPOSITIONS [1]

| No. | Polyester, Weight percent [2] | Benzoguanamine, Weight percent [3] | Film thickness, mils | Impact, inch lbs. | Flexibility [4] | Resistance to— [5] | | | |
|---|---|---|---|---|---|---|---|---|---|
| | | | | | | Iodine | Mar | Acetone | 2% NaOH 16 hrs. |
| 1 | 90 | 10 | 0.9 | 18 | P | F | F | F | F |
| 2 | 80 | 20 | 1.1 | 16 | P | F | F | F | F |
| 3 | 70 | 30 | 1.0 | 10 | P | F | F | P | P |
| 4 | 90 | 10 | 1.0 | 80+ | P | F | F | P | P |
| 5 | 80 | 20 | 1.1 | 80+ | P | P | F | P | P |
| 6 | 90 | 10 | 0.9 | 80+ | P | P | F | P | F |
| 7 | 80 | 20 | 1.0 | 80+ | P | P | F | P | P |
| 8 | 70 | 30 | 1.1 | 80+ | P | F | F | P | P |
| 9 | 90 | 10 | 1.4 | 2− | F | F | F | F | F |
| 10 | 80 | 20 | 1.3 | 2− | F | F | P | P | P |
| 11 | 70 | 30 | 1.3 | 2− | F | P | P | P | P |
| 12 | 90 | 10 | 1.5 | 2− | F | F | F | F | F |
| 13 | 80 | 20 | 1.5 | 2− | F | F | P | P | P |
| 14 | 70 | 30 | 1.3 | 2− | F | P | P | P | P |

[1] Solvent: Xylene, 60%; Butanol, 40%.
[2] Polyester: Nos. 1–8, see trimellitic polyester, Col. 7; Nos. 9–14, see phthalic polyester, Col. 4.
[3] Nos. 1–3: tetramethylol benzoguanamine; Nos. 4–5 and 9–11: tetrakis(methoxymethyl)benzoguanamine; Nos. 6–8 and 12–14: tetrakis(ethoxymethyl)benzoguanamine.
[4] 1/8-inch mandrel.
[5] P: Pass; F: Fail.

NOTE.—Nos. 1–3 gave sandy, non-homogeneous films. Nos. 4–5 gave films with exceptionally good gloss.

WATER SOLUBLE BAKED FINISH SURFACE COATING COMPOSITION

Unexpected stability in storage is obtained by forming a water solution of a water soluble form of the hereinabove defined polyester resin, a hereinafter defined group of tetrakis(alkoxymethyl)benzoguanamines.

Formation of the Water Soluble Polyester

The water soluble material contains polyester resin (polycondensation product), as hereinabove described, reacted with an alkaline reacting agent to obtain a water soluble material. The polyester resin and the agent are reacted until a water soluble form is obtained. Usually enough agent is used to neutralize the acidity of the polyester resin; less may be used. The amount of alkaline reacting material is most readily determined by following the pH of the aqueous medium. The polyester resin passes into solution substantially completely at pH of about 5. In practically all instances, the polyester will be in a complete solution at a pH of about 6. The use of alkaline agent in excess of that needed to bring all the polyester into solution is not harmful, at least up to a water solution pH of about 8. It is preferred to have the aqueous solution somewhat on the acid side or neutral, i.e., a pH of from 6 to 7.

The alkaline reacting agent may be ammonia or alkyl amine, or heterocyclicamine or an alkanolamine. Ammonium hydroxide as the aqueous solution containing 20–28% is suitable. The alkyl amines, particularly the lower molecular weight amines containing not more than 4 carbon atoms in each alkyl group, are especially suitable. The alkanolamines, such as 2-amino-2-methyl-1-propanol, ethanolamine and dimethylethanolamine, are preferred. The heterocyclicamines, such as morpholine, pyridine, and piperidine may be used. The type of alkaline reacting material used is determined in part by the characteristics desired in the final water soluble polyester; also, by the type of polyester which is to be converted to a water soluble form.

The solubilization reaction is carried out by contacting the polyester resin and the aqueous alkaline reacting medium. It is preferred that it be warm, i.e., maintained in the region of 100–160° F. The two are agitated until the polyester resin has passed into solution. The water solutions of the water soluble polyester resin are clear liquids usually containing some opalescent appearance; the solutions may be colorless or colored, depending on the particular water soluble polyester present.

*The Non-Crystalline Tetrakis(Alkoxymethyl)Benzoguanamines*

Previously there had been defined a group of tetrakis-(alkoxymethyl)benzoguanamines which are at ordinary temperatures non-crystalline, i.e. liquids; either mobile liquids, viscous liquids or glass-like materials. In these non-crystalline "chemically-mixed" benzoguanamines, each alkoxy has 1–3 carbon atoms and at least one alkoxy is a different carbon number than the others. The "chemically-mixed" benzoguanamines include equilibriated mixtures wherein each alkoxy has 1–3 carbon atoms, and at least two different carbon number alkoxys are present on a number of the benzoguanamine molecules such that the mixture is non-crystalline at ordinary temperatures. It has been pointed out that, in general, as little as 10% of the alkoxys present in the mixture differing in carbon number from the other alkoxys will produce a non-crystalline equilibriated mixture.

It has been observed that all of the hereinbefore defined tetrakis(alkoxymethyl)benzoguanamines can be brought into "solution" in a water solution of the hereinbefore defined polyester resin to obtain a water soluble composition which produces good baked finish surface coatings; however, when all of the alkoxy constituents in the particular tetrakis(alkoxymethyl)benzoguanamine have the same carbon number, the water soluble composition has no significant storage stability. For example, tetrakis(methoxymethyl)benzoguanamine and tetrakis-(ethoxymethyl)benzoguanamine precipitated out of solution in periods up to about one day after the "solution" was formed. When the chemically-mixed tetrakis(alkoxymethyl)benzoguanamines are used to form the solution, a true compatible solution is formed which apparently has indefinite storage life.

The water soluble composition of the invention is obtained by dissolving the non-crystalline tetrakis(alkoxymethyl)benzoguanamine in an aqueous solution of the polyester resin. If need be, the non-crystalline benzoguanamine is melted and then added to a preformed aqueous solution of the polyester resin. However, the polyester resin may be intermingled with the non-crystalline benzoguanamine and the mixture introduced into warm water containing the solubilizing alkaline material. Thus, simultaneously the aqueous solution of polyester resin and the final water soluble composition, in water solution, is obtained. In another variant of the operation, the non-crystalline benzoguanamine may be dissolved in a solution such as ethanol and this solution added to the aqueous solution of the polyester resin. Or in still another variation, a solution of resin and non-crystalline benzoguanamine may be formed in ethanol or acetone and this solution then treated with aqueous alkaline material to obtain the water soluble composition in aqueous solution.

The defined mixed benzoguanamines are only slightly soluble in water, however, when added to a water solution of the defined polyester resin, the mixed benzoguanamine readily passes into solution to form a compatible system of good storage life. Surprisingly, a very large amount of the mixed benzoguanamines can be taken into the water solution of the polyester resin and permit compositions containing "polyester:mixed benzoguanamine" blends ranging from 95:5 to 30:70, more usually, 85:15 to 40:60.

Preferably the compositions contain a proportion of "polyester:mixed benzoguanamine" blend in proportions ranging from about 80:20 to 70:30.

The water solution may be used as such to form baked varnish-like films which range from water white to brown coloring. Water soluble enamel compositions may be obtained by adding pigments, extenders, and dyes, if desired, to the clear water soluble composition. Surprisingly, the baked enamel finishes obtained from water solution possess the brilliant gloss as well as the toughness of the enamel finishes obtained from organic solvent compositions.

The water soluble compositions have curing rates essentially the same as the organic solvent compositions. In general, 30 minutes at 300° F. will give complete cures of substantially all the compositions. Temperatures higher than 300° F. may be used when shorter curing times are desired. The particular curing time will be dependent somewhat on the type and amount of the defined mixed benzoguanamine present in the composition.

EXAMPLES

A water solution of trimellitic polyester resin prepared according to the procedure set out on page 12 was dissolved in warm water containing dimethyl ethanolamine. The water solution contained approximately 40 weight percent of the resin solid. Rutile titanium dioxide was dispersed in the resin solution in a weight ratio of 0.9 part of dioxide to 0.8 part of polyester resin. This pigmented solution was then used as a base in the preparation of hereinafter described enamel formulations.

No. 15: Tetramethylol benzoguanamine was agitated with the pigmented solution. The tetramethylol benzoguanamine did not pass in solution at ordinary temperature nor did mild heating of the mixture cause the tetramethylol benzoguanamine to pass into solution.

No. 16: With the aid of mild heating, tetrakis(methoxymethyl)benzoguanamine readily passed into solution in the pigmented solution. Two formulations were prepared; one contained 20 parts of the benzoguanamine and 80 parts of the water soluble polyester resin, the other contained 30 parts of the benzoguanamine and 70 parts of the water soluble polyester. When freshly prepared, the enamel formulation appeared to be a true homogeneous solution, however, after standing for one day, each formulation precipitated out the tetrakis(methoxymethyl) benzoguanamine. Panels were prepared from freshly produced enamel formulations, and baked for 30 minutes at 300° F. The cured films had impact strengths of 80+ inch pounds and passed all the other standard tests. These tests show that in spite of the lack of storage stability, freshly prepared formulations of the water soluble enamel can produce superior baked films.

Formulations With Mixed Benzoguanamines

Another portion of the previously described trimellitic polyester resin was dissolved in water using dimethyl ethanolamine as the alkaline agent; this solution contained 38 percent by weight of the polyester resin. Some of the equilibriated mixture of methoxy and ethoxy containing benzoguanamines of Example 3, described at Col. 3, was added to the polyester solution. The mixed benzoguanamine rapidly passed into solution to produce a clear homogeneous formulation containing 70 parts by weight of the water soluble polyester and 30 parts by weight of the mixed benzoguanamine. This formulation, after several days' standing, was still clear—in one phase—and showed no evidence of benzoguanamine coming out of solution. A panel was prepared from the clear solution and baked for 30 minutes at 300° F.; the cured film was clear and very tough.

Nos. 17–21: Using the 38 percent polyester resin solids aqueous solution described above as a base, a pigmented solution was prepared by dispersing rutile titanium dioxide therein at a ratio of dioxide to resin of 0.9/0.8. Several test formulations were then prepared by dissolving into the pigmented solution various amounts of the equilibriated methoxy and ethoxy containing benzoguanamine of Example 3, described at Col. 3. Panels were prepared from these enamel formulations and cured at 300° F. for 30 minutes. The result of the testing of the baked films is set out hereinafter at Table II. All of these baked films were distinguished by extremely high gloss; this gloss was fully the equal of the gloss obtained from formulations using xylene-butanol solvent. The high impact strength and good flexibility shown by all of the enamel formulations of Nos. 17–21 permit even the poor performing low mixed benzoguanamide content formulations to have commercial acceptance for some uses.

No. 22: An enamel formulation was prepared by adding the equilibriated mixture of methoxy and ethoxy containing benzoguanamines of Example 4 described at Col. 3. This benzoguanamine rapidly passed into solution in the pigmented solution described above. This particular enamel formulation contained 20 parts by weight of the mixed benzoguanamine of Example 4 and 80 parts by weight of the trimellitic polyester resin in water soluble form. A panel was prepared from this formulation and cured at 300° F. for 30 minutes. The results of testing the cured panel are set out in Table II. No. 22 shows that this formulation is equally as good as similar formulations using the equal molar ratio of ethoxy and methoxy constituents of Example 3.

Portions of the formulations Nos. 17–22 have been standing in storage for several weeks and it appears that the formulations will have an indefinite storage stability, since in all previous experiments, lack of compatibility has been self-evident in a period of approximately one day.

As a matter of information, panels prepared from the water soluble form of the above described trimellitic polyester resin, in the absence of the defined benzoguanamines do not form cured films when baked at 300° F. for 30 minutes. These films did not cure completely until exposed for at least 30 minutes to at least 400° F. temperature.

COMPARISON 1-2 RESIN COMPOSITIONS

In a previous study with another class of alkylated melamines, it was observed that polyester resins prepared from trimellitic anhydride and alkylene glycol only could be dissolved in water along with the melamine and baked at 300° F. for 30 minutes to give very good films. For purposes of comparison, formulations containing such a polyester resin (hereinafter called 1-2 resin) and equilibriated mixed benzoguanamines of Example 3 described at Col. 3 were prepared. These formulations were prepared as follows:

The 1-2 resin was prepared by cooking a charge of 5.53 moles of neopentyl glycol and 2.50 moles of trimellitic anhydride for 4½ hours at 350° F. until the acid number was 52.

This resin was dissolved in water by the usual procedure using dimethylethanol amine. The solution was then pigmented with rutile $TiO_2$ in the ball mill to a $TiO_2$ resin weight ratio of 1.12. The equilibriated benzo-

TABLE II.—BAKED FILM PROPERTIES FROM WATER COMPOSITIONS

| No. | Polyester, Weight percent [1] | Benzoguanamine, Weight percent [2] | Film thickness, mils | Impact, inch lbs. | Flexibility [3][4] | Resistance to— | | | |
|---|---|---|---|---|---|---|---|---|---|
| | | | | | | Iodine | Mar | Acetone | 2% NaOH 16 hrs. |
| 17 | 92.5 | 7.5 | 0.8 | 80+ | P | F | F | F | F |
| 18 | 90 | 10 | 0.8 | 80+ | P | F | F | F | F |
| 19 | 85 | 15 | 0.8 | 80+ | P | P | P | P | P |
| 20 | 70 | 30 | 0.8 | 80+ | P | P | P | P | P |
| 21 | 55 | 45 | 0.8 | 80+ | P | P | P | P | P |
| 22 | 80 | 20 | 1.0 | 80+ | P | P | P | P | P |

[1] Nos. 17–22: see trimellitic polyester, Col. 7.
[2] Nos. 17–21: equilibriated mixture of Example 3, Col. 3; No. 22: equilibriated mixture of Example 4, Col. 3.
[3] ⅛-inch mandrel.
[4] P: Pass; F: Fail.

guanamine of Example 3, Col. 3 was then mixed with the pigmented solution to form a water soluble enamel composition; five enamels were prepared. Wet films were then baked at 300° F. for 30 minutes on bonderite steel panels.

The resin:mixed benzoguanamine blends were 90:10; 80:20; 70:30; 50:50; and 30:70, respectively. The baked films were 0.8–0.9 mil thickness. The impact strength ranged from 2 to 12 inch lbs. All the panels failed the flexibility test using a ⅛-inch mandrel. All the panels failed the mar resistance test. All the panels passed the iodine resistance test. All the panels passed the 2 percent NaOH (16 hours) test. With the exception of the 30:70 enamel, the panels passed the acetone resistance test. The poor performance of these compositions, compared to the Nos. 17–22 compositions, was surprising.

Thus having described the invention, what is claimed is:

1. Tetrakis(alkoxymethyl)benzoguanamine wherein each alkoxy has from 1 to 3 carbon atoms and at least one alkoxy has a different number of carbon atoms than the others, said benzoguanamine being characterized by the non-crystalline state at ordinary temperatures.

2. The benzoguanamine of claim 1 wherein two alkoxys have 1 carbon atom and two alkoxys have 2 carbon atoms.

3. The benzoguanamine of claim 1 wherein three alkoxys have 1 carbon atom and one alkoxy has 2 carbon atoms.

4. An equilibriated mixture of tetrakis(alkoxymethyl)benzoguanamines wherein each alkoxy has 1–3 carbon atoms and at least two different carbon number alkoxys are present on a number of said benzoguanamine molecules so that said mixture is characterized by the non-crystalline state at ordinary temperatures.

5. The mixture of claim 4 wherein the alkoxys have 1–2 carbon atoms and the molar ratio of "1" carbon alkoxys to "2" carbon alkoxys in said mixture is about 1.

6. The mixture of claim 4 wherein the alkoxys have 1–2 carbon atoms and the molar ratio of "1" carbon alkoxys to "2" carbon alkoxys in said mixture is about 3.

References Cited in the file of this patent
UNITED STATES PATENTS

| | | |
|---|---|---|
| 2,448,338 | Widmer et al. | Aug. 31, 1948 |
| 2,709,693 | Widmer et al. | May 31, 1955 |